Dec. 31, 1957     R. J. GALES     2,818,313
ROLLER BEARING
Filed Aug. 18, 1955
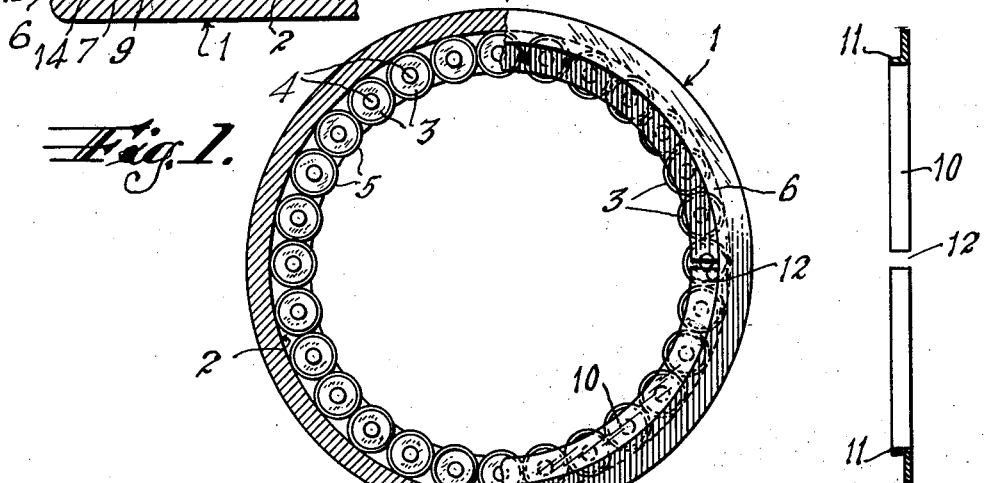
INVENTOR.
Richard J. Gales,
BY
ATTORNEY

United States Patent Office 2,818,313
Patented Dec. 31, 1957

2,818,313

ROLLER BEARING

Richard J. Gales, Caldwell, N. J., assignor to Orange Roller Bearing Company, Orange, N. J., a corporation of New Jersey Application August 18, 1955, Serial No. 529,217

1 Claim. (Cl. 308—212)

This invention relates to anti-friction bearings and more particularly to roller bearings comprising a race member having a cylindrical roller bearing surface, a complement of rollers, and roller retaining rings cooperative with reduced end portions of the rollers to prevent displacement of the rollers from the race member.

A prime object of the present invention is to provide a roller bearing having a single race member constructed and combined in a novel and improved manner with a roller retaining ring so as to prevent damage to the race member, to the retaining ring and to the reduced end portions of the rollers by end thrusts of the rollers, thereby increasing the life of the roller bearing.

Another object of the invention is to provide a cylindrical race member for the rollers having an annular flange with a straight inner surface of considerable area at each end thereof normal to the axis of the race member to be abutted by end surfaces of the rollers that are normal to their axes, for absorbing the end thrusts of the rollers and for preventing longitudinal displacement of said rollers.

A further object of the invention is to provide a self-contained roller bearing assembly which can be handled as a unit and so arranged that the rollers can be fitted in or replaced in an easy and simple manner when desired.

Still another object of the invention is to provide a roller bearing which is of relatively small diameter and which may be installed in a relatively small space as compared with the usual types or forms of roller bearings now in general use.

It is further proposed to produce a roller bearing which is simple in construction, economical to manufacture and which can be sold at a reasonable cost.

For a further comprehension of the invention and of the objects and advantages thereof, reference will be had to the following description and accompanying drawing and to the appended claim in which the various novel features of the invention are more particularly set forth.

In the accompanying drawing forming a material part of this disclosure:

Figure 1 is a part end elevational and part sectional view of a roller bearing embodying my invention.

Figure 2 is a vertical sectional view taken substantially on the plane of the line 2—2 of Figure 1.

Figure 3 is a view similar to Figure 2, the rollers and retaining rings being omitted.

Figure 4 is a detached sectional view of one retaining ring taken on an axial plane; and Figure 5 is an enlarged fragmentary vertical sectional view of the assembled bearing showing the manner in which the flange of the race member resists endwise thrust of the rollers.

Referring now to the drawing in detail, invention is shown as embodied in a bearing assembly which includes a cylindrical body or sleeve 1, preferably formed of hardened steel, constituting an outer race ring or member and presenting an inwardly facing cylindrical bearing surface 2 which serves as a bearing race. A plurality of rollers 3 are rotatably mounted on the surface 2, which rollers form a continuous series extending entirely around the surface to which they are applied, with adjacent rollers free to contact with each other. Each roller is formed with integral end extensions 4, projecting axially of the roller. The extensions are preferably round in cross-section and of smaller diameter than the bearing surface 5 of the roller.

In accordance with the invention, the body or sleeve 1 is integrally formed at each end with an inwardly extending annular flange 6, separated from the body or sleeve proper by an annular groove 7. When the rollers are assembled in operative position on the surface 2, the end faces 8 thereof are disposed parallel to and spaced from the inner faces 9 of the flanges 6 which are in planes perpendicular to the axis of said bearing surface, the flanges each extending inwardly of the body or sleeve 1 a sufficient distance to overlap a considerable portion of the faces 8, whereby the faces 9 of the flanges serve as axial thrust faces for the rollers mounted on the surface 2.

Retaining rings 10 are provided for holding the rollers 3 in operative assembled position. Each ring is made of solid spring steel and is formed with a flat body and a right angularly extending flange 11 on its inner periphery and is split as indicated at 12. When in assembled position as shown in Figure 2, the outer peripheral edge of the body of the ring is seated in an annular groove 13 formed in the inner periphery of the flange 6 of the body or sleeve 1. The flange 11 of the ring extends inwardly of the respective end of the sleeve 1 in coaxial, spaced, opposed and parallel relation to the inner peripheral surface of the flange 6 so that the ring and the inner periphery of the sleeve form a trough 14 into which the end extensions 4 of the rollers project. The ring flanges 11 overhang the end extensions 4 and prevent radial displacement of the rollers.

When the rollers are in operative contact with the surface 2 of the bearing member, the end faces are spaced from the flanges 6 and the end extensions 4 thereof are spaced a distance from the rings 10 so that they will not drag thereon as shown in Figure 2, and so that upon endwise movement of the rollers, the end faces 8 of the rollers will abut against the inner faces 9 of the flanges 6 of the sleeve, preventing contact of the extreme ends of said end extensions with the rings, and absorbing shocks caused by end thrusts of the rollers as shown in Figure 5. This construction thus renders the roller bearing resistant to abuse and injury so that the life of the bearing is considerably increased and rejection of the bearings on inspection thereof is reduced to a minimum.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new and desire to secure by United States Letters Patent is:

A roller bearing embodying a race member having a cylindrical bearing surface and an end flange integral with said race member at each end of said bearing surface coaxial therewith and extending therebeyond with its inner face in a plane perpendicular to the axis of said bearing surface, the peripheral surface of each end flange having a circumferential groove, split roller retaining rings, each comprising a flat body and a permanent right angularly projecting flange and having a peripheral edge of its said body seated in said grove of one end flange and having its said flange in spaced, opposed, coaxial, parallel relation to said peripheral surface of said flange of the race member, and a complement of cylindrical rollers engaging said bearing surface, each roller having end faces normal to its axis and each roller also having coaxial reduced end portions each disposed between said flange of one retaining ring and the peripheral surface of the corresponding end flange of said race member, the length of the rollers between said end faces and the length of said reduced end portions being such that each end face of each roller will abut the inner face of one of said end flanges of the race member with said end face and the extremity of the corresponding reduced end portion of the roller in spaced relation to the corresponding roller retaining ring upon endwise movement of the roller in either of opposite directions, whereby each split roller retaining ring may be sprung and then snapped into the peripheral groove of one of said end flanges of the race member, the end thrust of said rollers will be assumed entirely by contact of said end surfaces of the rollers with said inner faces of the end flanges of the race member and said roller retaining rings will be entirely free from the end thrust of said rollers.

References Cited in the file of this patent

UNITED STATES PATENTS 1,350,325   Miller _____ Aug. 24, 1920

FOREIGN PATENTS 992,293   France _____ July 11, 1951